(12) United States Patent
Schubert et al.

(10) Patent No.: US 9,732,777 B2
(45) Date of Patent: Aug. 15, 2017

(54) TRACTION SHEAVE CLAMPING DEVICE

(71) Applicant: SIEMAG TECBERG GmbH, Haiger (DE)

(72) Inventors: Wolfgang Schubert, Netphen (DE); Klaus Hofmann, Netphen (DE); Stephan Sonneborn, Bad Laasphe (DE)

(73) Assignee: SIEMAG TECBERG GMBH, Haiger (DE)

( * ) Notice: Subject to any disclaimer, the term of this patent is extended or adjusted under 35 U.S.C. 154(b) by 0 days.

(21) Appl. No.: 14/365,417

(22) PCT Filed: Dec. 7, 2012

(86) PCT No.: PCT/EP2012/074851
§ 371 (c)(1),
(2) Date: Jun. 13, 2014

(87) PCT Pub. No.: WO2013/087540
PCT Pub. Date: Jun. 20, 2013

(65) Prior Publication Data
US 2014/0314478 A1    Oct. 23, 2014

(30) Foreign Application Priority Data

Dec. 16, 2011 (DE) .................. 10 2011 121 458

(51) Int. Cl.
*B25G 3/00* (2006.01)
*F16B 2/14* (2006.01)
(Continued)

(52) U.S. Cl.
CPC ............ *F16B 2/065* (2013.01); *B66B 5/0087* (2013.01); *B66B 15/04* (2013.01); *Y10T 403/76* (2015.01)

(58) Field of Classification Search
CPC ..... Y10T 403/76; B66B 5/0087; B66B 15/04; F16B 2/06
(Continued)

(56) References Cited

U.S. PATENT DOCUMENTS 140,786 A * 7/1873 Mellen .................... F16D 53/00
187/254
1,653,062 A * 12/1927 Rieske .................... B66B 15/04
474/10
(Continued)

FOREIGN PATENT DOCUMENTS

DE    000P0005797D    10/1948
DE    3427710    1/1986
(Continued)

*Primary Examiner* — Gregory Binda
*Assistant Examiner* — Nahid Amiri
(74) *Attorney, Agent, or Firm* — 24IP Law Group; Timothy R DeWitt

(57) ABSTRACT

A traction sheave clamping device for detachably fixing ropes to the traction sheave of a Koepe hoist, having at least one clamp crossbeam, at least two anchoring elements for engaging in wedge-shaped or hook-shaped grooves in the face sides of the traction sheave/cable chuck rim sheets, and stud bolts for connecting the anchoring elements to the clamp crossbeam, wherein the anchoring elements and the traction sheaves have corresponding torque support surfaces extending substantially in the pull direction of the stud bolts, wherein the extension of the torque support surfaces in the pull direction of the stud bolts is a multiple of the distance between the stud bolt center axis and the anchoring point.

6 Claims, 4 Drawing Sheets

(51) Int. Cl.
*F16B 2/06* (2006.01)
*B66B 5/00* (2006.01)
*B66B 15/04* (2006.01)

(58) Field of Classification Search
USPC ..... 403/312, 409.1; 187/254, 256, 259, 266, 187/267
See application file for complete search history.

(56) References Cited

U.S. PATENT DOCUMENTS

| | | | | |
|---|---|---|---|---|
| 2,752,797 | A | * | 7/1956 | Sherwin ................ F16H 55/50 104/202 |
| 2,942,702 | A | * | 6/1960 | Furey .................... B63B 25/002 52/690 |
| 4,063,782 | A | * | 12/1977 | Bahre .................... E21C 35/12 299/34.1 |
| 4,632,605 | A | * | 12/1986 | Tucker .................. E21D 11/006 405/259.1 |
| 5,490,578 | A | * | 2/1996 | Aulanko ............. B66B 11/0045 187/254 |
| 5,944,294 | A | * | 8/1999 | Baer ...................... A47F 5/0846 248/220.43 |
| 7,404,677 | B2 | * | 7/2008 | Klotmann ................ F27B 7/22 384/549 |
| 8,028,393 | B2 | * | 10/2011 | Bjorni ...................... B66B 19/02 187/412 |

FOREIGN PATENT DOCUMENTS

| | | |
|---|---|---|
| DE | 3705811 | 9/1988 |
| DE | 102006014131 | 6/2007 |
| EP | 1591406 | 11/2005 |
| FR | 2000108 | 8/1969 |
| JP | 10087220 | 10/1999 |

* cited by examiner

TRACTION SHEAVE CLAMPING DEVICE

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

Field of the Invention

The present invention relates to a traction sheave clamping device for the detachable fixation of ropes on the traction sheave of a Koepe hoist.

Description of the Related Art

It is a known procedure in Koepe hoists that for maintenance purposes the rope or ropes are occasionally firmly fixed to the traction sheave of the Koepe hoist, using one or more traction sheave clamps.

For that purpose, it is customary that wedge-shaped circumferential grooves are provided in the outer faces of the traction sheave or the cable chuck rim sheets in which the traction sheave clamps engage via anchoring elements, and that they are braced with threaded bolts.

In practical application, the known anchoring elements show that depending on their geometric design, a torque can be applied to the clamping bolt from the internal support of the anchoring elements, and that this can cause the bolt to bend under unfavourable friction conditions and/or as the result of improper installation.

SUMMARY OF THE INVENTION

It is the object of the present invention to provide a traction sheave clamping device that eliminates the disadvantages of the known state of the art, and which can be simply and economically manufactured and operated.

This object is achieved with the characteristics of independent claim 1, whereby appropriate embodiments are described by means of the characteristics of the dependent claims.

A traction sheave clamping device is provided for the detachable fixation of ropes to the traction sheave of Koepe hoists, with at least one clamp crossbeam for fixing the rope, at least two anchoring elements for engaging in circumferential wedge-shaped or alternatively hook-shaped grooves in the faces of the traction sheave/cable chuck rim sheets, as well as threaded bolts for connecting the anchoring elements to the clamp crossbeam, whereby the anchoring elements and the traction sheaves are provided with corresponding torque support surfaces extending substantially in the pull direction of the threaded bolts, whereby the extension of the torque support surfaces in the pull direction of the threaded bolts is a multiple of the distance between the threaded bolt centre axis and the anchoring point.

By designing the anchoring element in the above described way, it is achieved that a resulting torque is better supported in the anchoring element, such that as little as possible or no torque is applied to the threaded bolt.

In a preferred embodiment of the invention, the torque support surfaces can be divided into at least two partial support surfaces, for example in the form of a bend such that in conjunction with the engagement of the anchoring element in the respective circumferential groove, there is an extended positive engagement of the anchoring element with the traction sheave or its cable chuck rim sheet, resulting in still greater torque stability.

In another preferred embodiment, it is provided that the respective threaded bold centre axes or their main direction of force are arranged in alignment with the anchoring point of the respective anchoring element, such that the clamping bolt's bending stress is prevented or minimized.

To be able to take manufacturing tolerances into account, ball jointed washers can sometimes be inserted under the tightening nut.

Other characteristics and advantages of the invention become apparent from the following purely demonstrative and in no way limiting description of preferred embodiments of the invention, with reference to the attached drawings, where

DETAILED DESCRIPTION OF THE INVENTION

Figure 1:
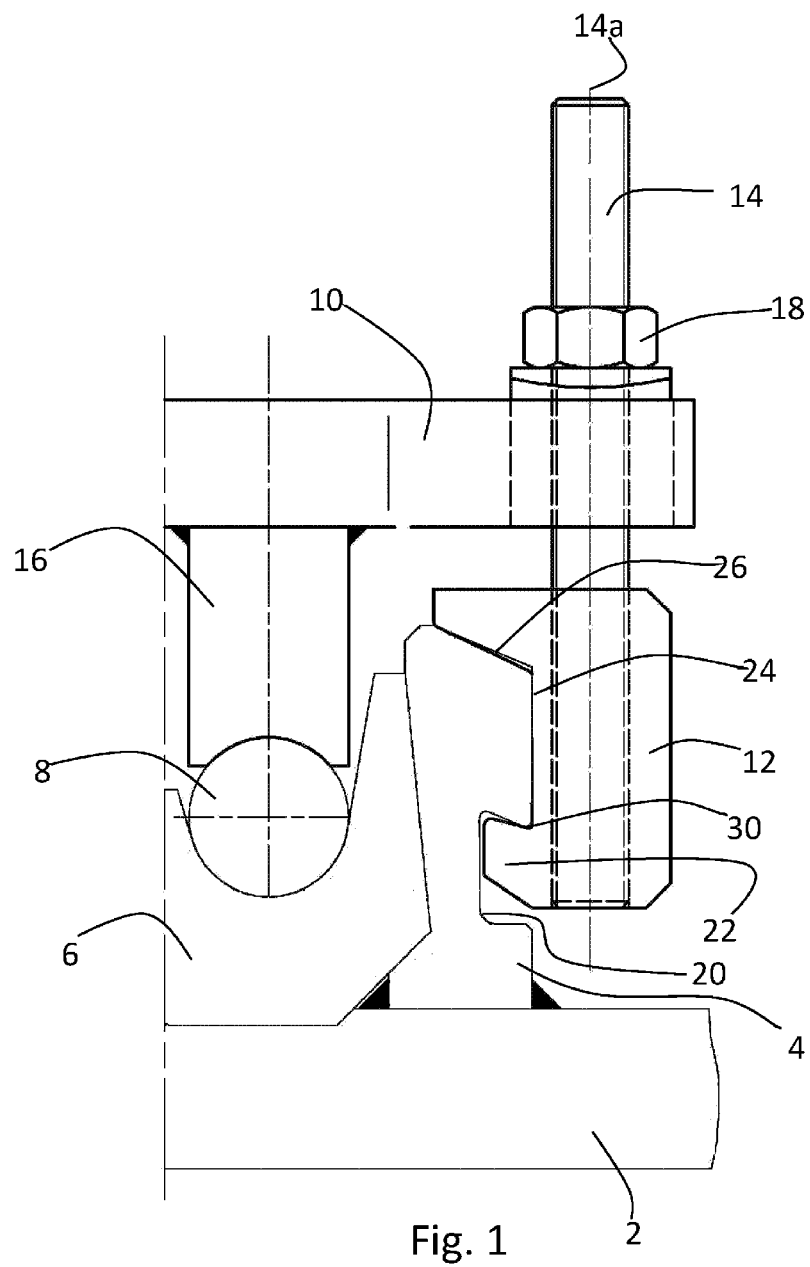
FIG. 1 shows a cross section through a partial view of a preferred embodiment of a traction sheave clamping device according to the invention.

FIG. 1 shows a cross section through a partial view of a preferred embodiment of a traction sheave clamping device according to the invention. This shows a cut-out of a traction sheave 2 on which a cable chuck rim sheet 4 is arranged, and a cable chuck 6 itself in which the rope runs. FIG. 1 also shows a traction sheave clamping device with a clamp crossbeam 10, an anchoring element 12 and a threaded bolt 14 for connecting the anchoring element 12 with the clamp crossbeam 10.

As is also shown in FIG. 1, the underside of clamp crossbeam 10 is provided with a clamping projection 16 which, when the threaded bolts 14 are tightened with nut 18, are pressing upon rope 8 and fix it in cable chuck 6.

As is also shown in FIG. 1, the cable chuck rim sheet or the traction sheave are provided on their outer face with a wedge-like circumferential groove 20 in which an anchor lug 22 of anchoring element 12 engages, whereby in the embodiment shown in FIG. 1, the engagement of anchor lug 22 is conical, resulting in an anchoring point 30.

Extending above anchor lug 22 are torque support surfaces 24 and 26 provided correspondingly on cable chuck rim sheet 4 and at anchoring element 12. As can be seen, the extension of these torque support surfaces in pull direction of the threaded bolts is a multiple of the distance between the threaded bolt centre axis 14a and the torque support surfaces 24, 26, such that torques or bending moments acting upon threaded bolt 14 can be prevented.

Figure 2:
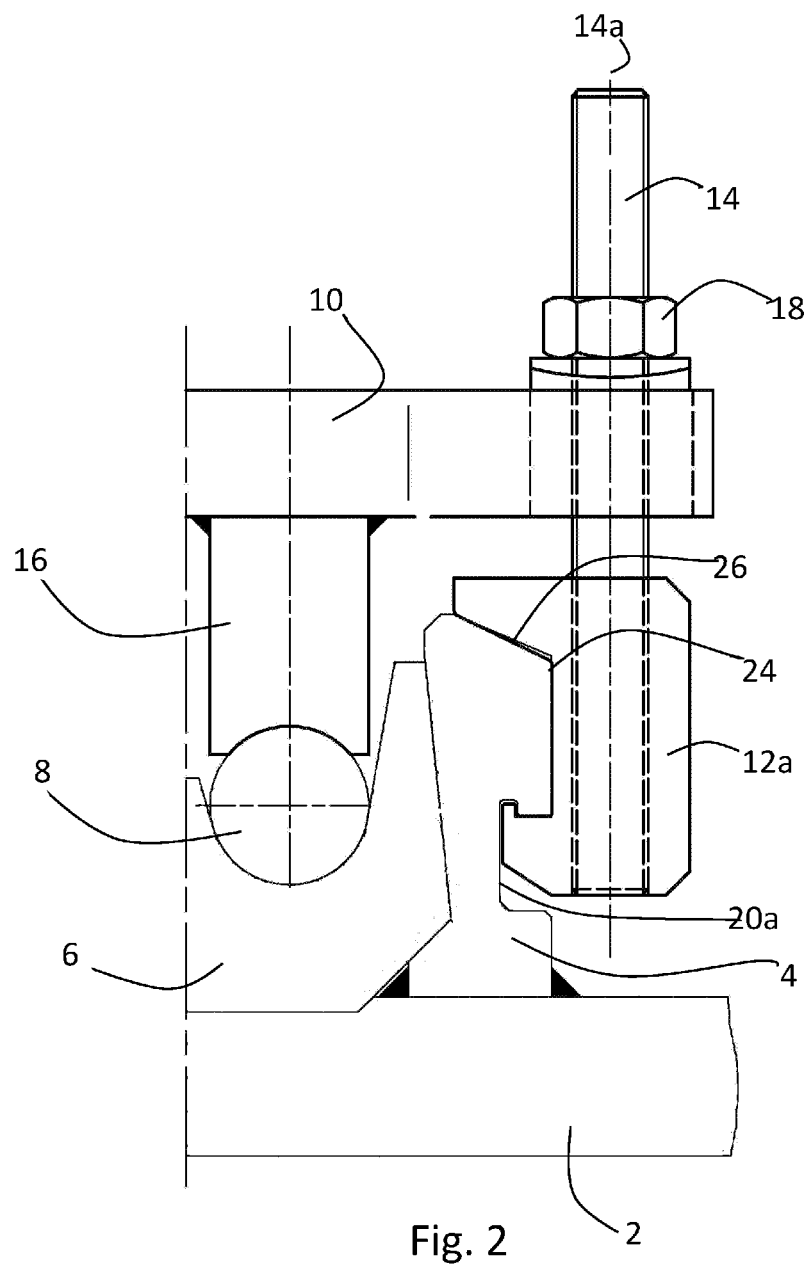
FIG. 2 shows an alternative of the embodiment shown in FIG. 1.

FIG. 2 shows a version of the embodiment shown in FIG. 1 where the only difference consists in that the circumferential groove 20a is hook-shaped or flat and not wedge-shaped or conical, while the anchor lug 22a of anchoring element 12a is correspondingly flat or hook-shaped.

Figure 3:
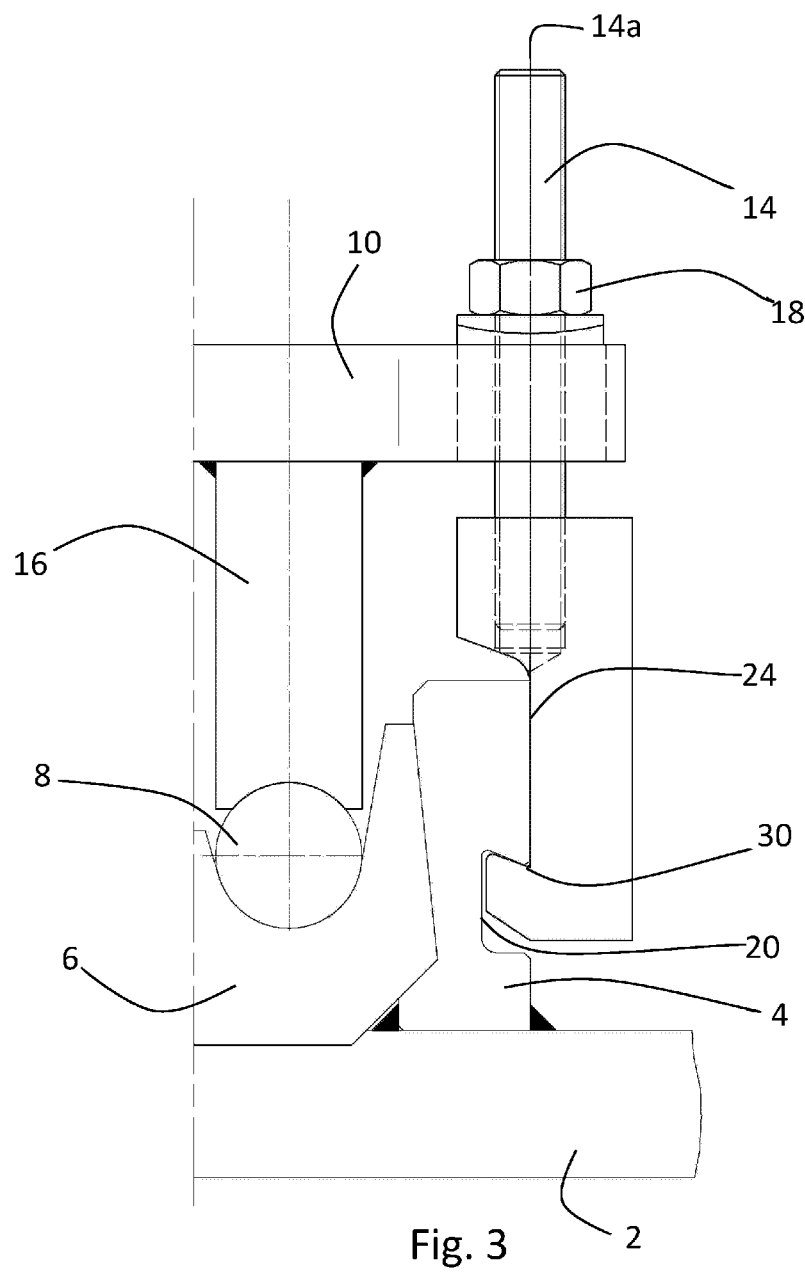
FIG. 3 shows a cross section through a partial view of a second preferred embodiment of a traction sheave clamping device according to the invention.

FIG. 3 shows a cross section through a partial view of another preferred embodiment of a traction sheave clamping device according to the invention, whereby elements corresponding to those in FIG. 1 are marked with the same reference numbers.

The embodiment shown in FIG. 3 is provided with a modified anchoring element 28 which, together with cable chuck rim sheet 4 only shows a corresponding torque support surface 24. The threaded bolt centre axis 14a is arranged thus that the main direction of force is in alignment with anchoring point 30. In that way, torques or bending moments acting upon threaded bolt 14 can be completely eliminated.

Figure 4:
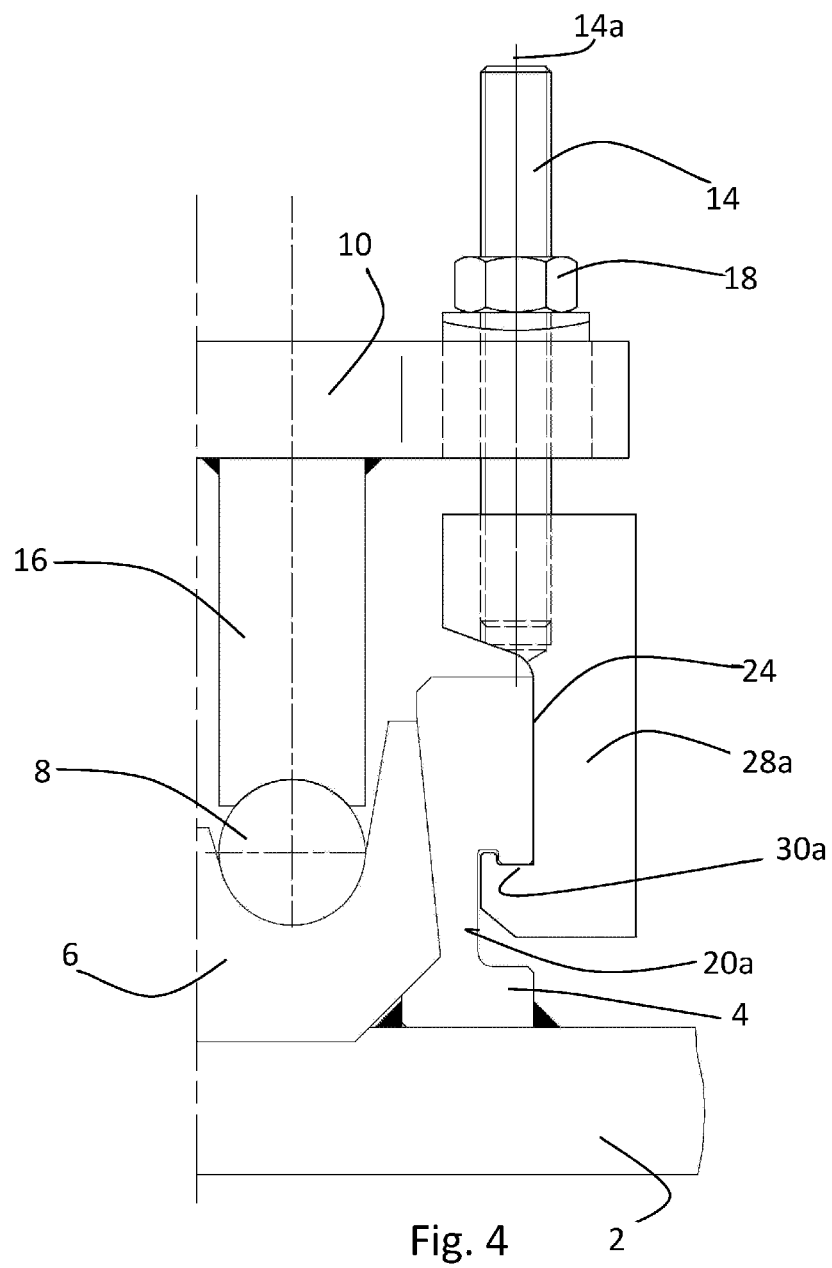
FIG. 4 shows a version of the embodiment shown in FIG. 3.

FIG. 4 shows a version of the embodiment as shown in FIG. 3 where only the type of anchoring of the bent-down anchoring element 28a in the cable chuck rim sheet 4 is modified, which in the case of the embodiment in FIG. 4 is flat or hook-shaped and not conical as shown in FIG. 3. As a result, the anchoring point 30a is moved inwards such that the centre axis 14a of threaded bolt 14 is also moved to align with anchoring point 30a.

The invention claimed is:

1. A traction sheave clamping assembly comprising:
   a traction sheave having two circumferential grooves;
   at least one clamp crossbeam;
   at least two anchoring elements for engaging in the circumferential grooves in the traction sheave; and
   threaded bolts for connecting the anchoring elements to the clamp crossbeam, each threaded bolt having a center axis;
   wherein the anchoring elements and the traction sheave have corresponding torque support surfaces extending substantially in a pull direction of the threaded bolts; and
   wherein the extension of the torque support surfaces in the pull direction of the threaded bolts is a multiple of the distance between the threaded bolt center axis and an anchoring point of a corresponding anchoring element.

2. The traction sheave clamping assembly according to claim 1, wherein the torque support surfaces are divided into at least two partial support surfaces.

3. The traction sheave clamping assembly according to claim 1, wherein the circumferential grooves are wedge-shaped.

4. The traction sheave clamping assembly according to claim 1, wherein the circumferential grooves are hook-shaped.

5. A traction sheave clamping assembly comprising:
   a traction sheave having two circumferential grooves;
   at least one clamp crossbeam;
   at least two anchoring elements for engaging in the circumferential grooves in the traction sheave; and
   threaded bolts for connecting the anchoring elements to the clamp crossbeam, each threaded bolt having a center axis;
   wherein the anchoring elements and the traction sheave have corresponding torque support surfaces extending substantially in a pull direction of the threaded bolts; and
   wherein the extension of the torque support surfaces in the pull direction of the threaded bolts is a multiple of the distance between the threaded bolt center axis and an anchoring point of a corresponding anchoring element; and
   wherein the threaded bolt center axes are arranged to be in alignment with the anchoring point of the respective anchoring element.

6. A traction sheave clamping assembly comprising:
   a traction sheave;
   a cable chuck rim sheet connected to said traction sheave, said cable chuck rim sheet having two circumferential grooves;
   at least one clamp crossbeam;
   at least two anchoring elements for engaging in the circumferential grooves in the cable chuck rim sheet; and
   threaded bolts for connecting the anchoring elements to the clamp crossbeam, each threaded bolt having a center axis;
   wherein the anchoring elements and the traction sheave have corresponding torque support surfaces extending substantially in a pull direction of the threaded bolts; and
   wherein the extension of the torque support surfaces in the pull direction of the threaded bolts is a multiple of the distance between the threaded bolt center axis and an anchoring point of a corresponding anchoring element.

* * * * *